United States Patent [19]

Herman

[11] Patent Number: 4,567,707

[45] Date of Patent: Feb. 4, 1986

[54] GEODESIC STRUCTURE

[76] Inventor: Joseph Herman, c/o Gustalo Nunez, 4463 Oberlin Ave., Lorain, Ohio 44053

[21] Appl. No.: 598,490

[22] Filed: Apr. 9, 1984

[51] Int. Cl.⁴ .............................................. E04C 1/10
[52] U.S. Cl. .......................................... 52/586; 52/81; 52/DIG. 10; 403/171
[58] Field of Search .................. 52/81, 586, DIG. 10, 52/648; 403/171, 173, 176

[56] References Cited

U.S. PATENT DOCUMENTS

| | | | |
|---|---|---|---|
| 2,931,467 | 4/1960 | Fentiman | 403/171 |
| 3,152,819 | 10/1964 | Fentiman | 403/171 |
| 3,275,351 | 9/1966 | Fentiman | 403/171 |
| 3,476,421 | 11/1969 | Torres | 403/173 |
| 3,490,800 | 1/1970 | Wissler | 52/586 |
| 3,494,578 | 2/1970 | Cureton | 52/DIG. 10 |
| 3,766,932 | 10/1973 | Sidis et al. | 52/81 X |
| 3,891,335 | 6/1975 | Feil | 403/173 |
| 4,338,753 | 7/1982 | Janke | 52/586 X |
| 4,480,418 | 11/1984 | Ventrella | 403/171 X |

Primary Examiner—J. Karl Bell
Attorney, Agent, or Firm—Gustalo Nunez

[57] ABSTRACT

A flat keyway joint member having a multiplicity of sides, each side having a keyway slot for receiving an arcuately disposed elongated key. A predetermined number of joint members and key members are connected together for the assembly of a particularly designed member resulting in a structure completely closed upon itself. This invention may be used to construct geodesic structures and the like for such wide and varied use such as planters, greenhouses, etc. When used in greenhouse construction, the entire greenhouse can be assembled on the ground and simply raised when completed.

2 Claims, 19 Drawing Figures

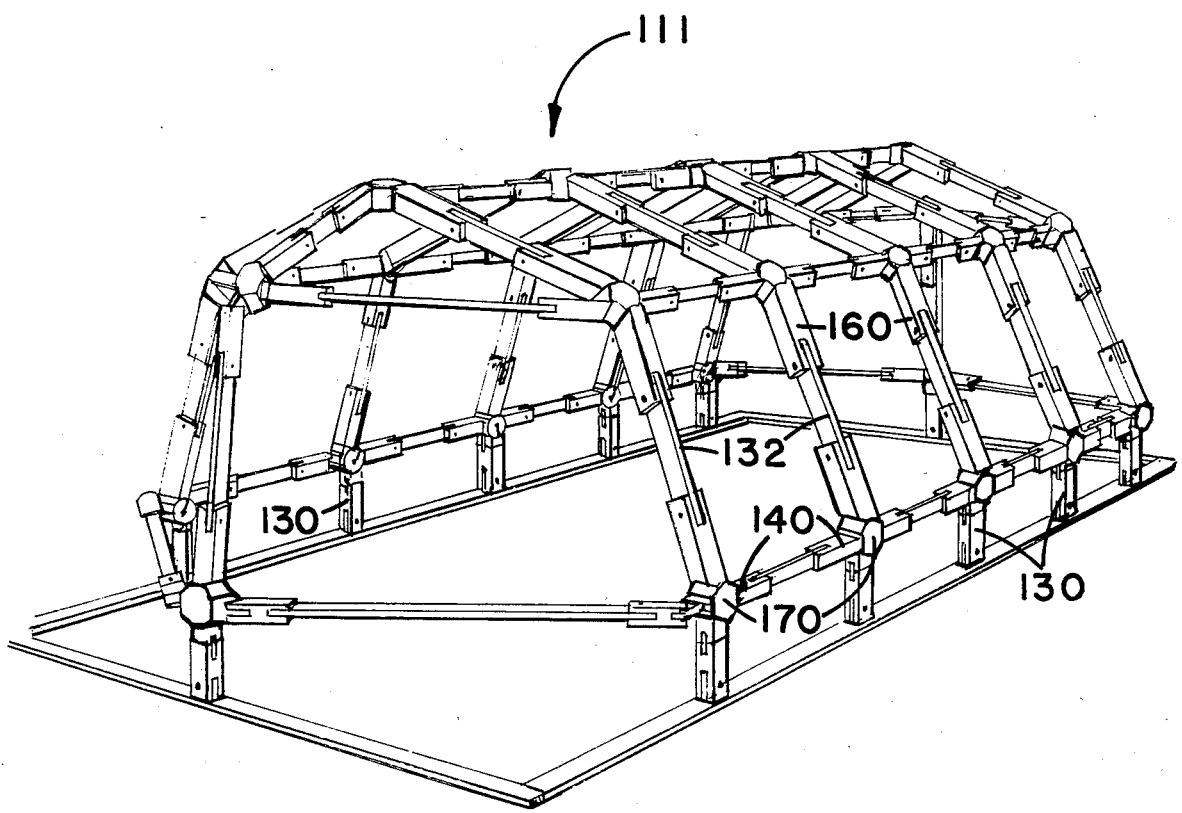
FIG.11
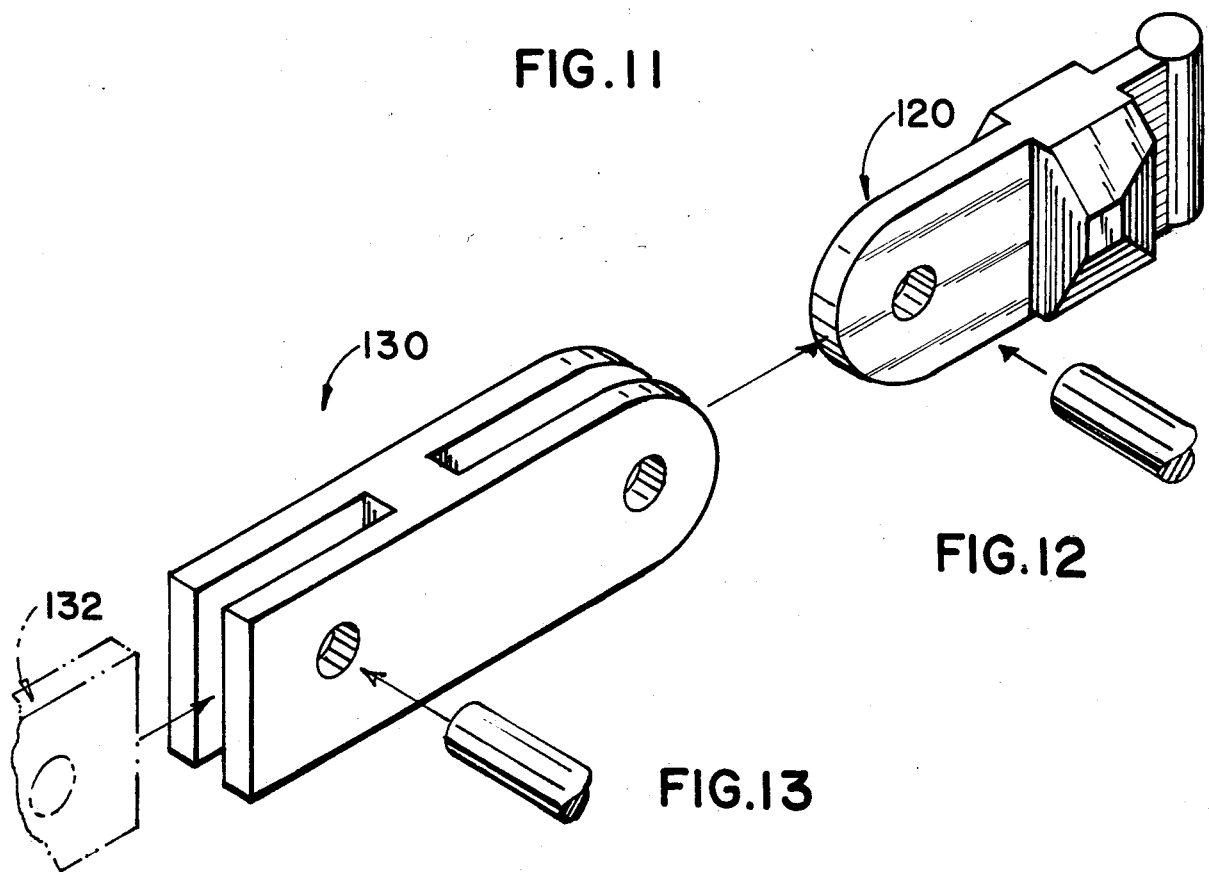
FIG.12
FIG.13

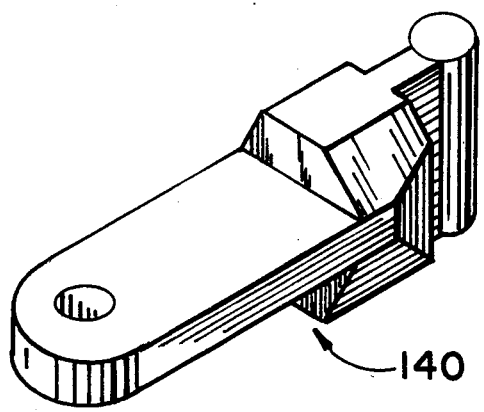
FIG.14
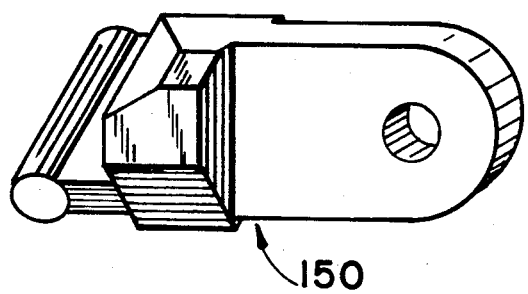
FIG.15
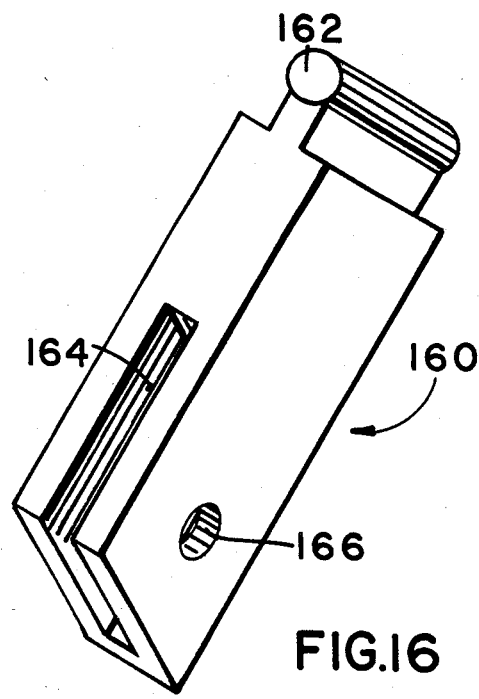
FIG.16
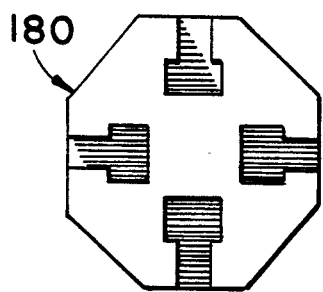
FIG.18
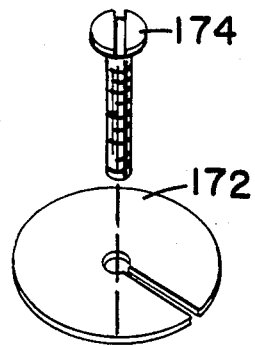
FIG.17
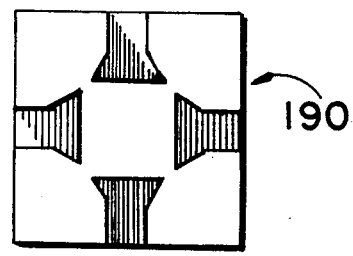
FIG.19
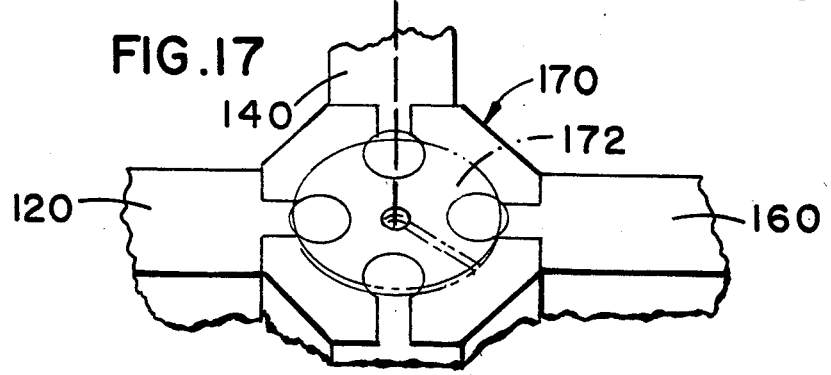

GEODESIC STRUCTURE

BACKGROUND OF THE INVENTION

1. Field of the Invention

The invention contemplated here is directed to improvements in structural framework and is directed particularly to a novel key and keyway joint useable for the fabrication and assembly of geodesic structures and the like.

The invention is further directed to a structure which is easily assembled and is also easily disconnected and which is simple in design, economical in cost and which can be used for a variety structure designs.

The invention is further directed to a keyway joint and key in which the key ends and key joints are of complementary interlocking form and in which any number of keyways may be interlocked with a keyway joint at angles defined by the terminating ends of the keyways.

The applicant's invention discloses a simple method in which his connecting members can be used to construct structurally sound configurations and which may be easily disassembled and reassembled any number of times.

2. Description of the Prior Art

U.S. Pat. No. 3,152,819 issued to Fentiman discloses an invention directed to a key and keyway joint for structural assemblies and in particular to a connector having a plurality of keyways therein with their longitudinal medium in angular relation and presumably capable of assuming a great variety of structural forms. The keys and keyway joints disclosed by Fentiman are structurally different and mechanically more complex than that contemplated by the applicant herein. The geodesic structure contemplated by the applicant could not be assembled by the use of the keys and keyway joints disclosed by Fentiman.

U.S. Pat. No. 2,931,467, issued to Fentiman discloses a rod coupling in which rod ends and connectors are of complementary interlocking form and in which any desired number of rods may be coupled together for use in the construction of scaffolds, bridges, walls, roofs and the like. The rods and connectors disclosed by Fentiman are also structurally different and mechanically more complex than that disclosed by the applicant.

Feil, U.S. Pat. No. 3,891,335 discloses a structure of square configuration having slots extending diagonally from each of the corners towards the center of the body member. The slots are elongated and widen into a socket portion at the inner end to receive a flat member. The invention disclosed by Feil is directed to holder devices such as display units. It can be seen that the structure disclosed by Feil could not be utilized in the fabrication of that disclosed by the applicant herein.

U.S. Pat. No. 3,275,351, issued to Fentiman is directed to an invention providing a joint embodying a keyway type connector having integral, nut carrying threaded ends for use in the construction of space frames, walls and the like.

SUMMARY OF THE INVENTION

The invention directed to improved keys and keyway joints for use in the fabrication, construction and assembly of a variety of structures and particularly geodesic structures. The invention provides a keyway joint having a plurality of elongated slots for receiving a plurality of elongated keys, said keys and slots are of complementary interlocking form. Further, the keys provided are angularly disposed from the keyway joint at an angle which is determined by the structure construction being contemplated. The keyway joint slots are elongated in a direction parallel to the longitudinal axis of the keyway joint. Further, the elongated slots begin at a predetermined distance from one end of said keyway joint and continuing to the opposing terminating end of keyway joint. The geodesic structure is fabricated by starting with one keyway joint and locking in the keyway slots, a plurality of elongated keys, one for each keyway slot. At the other end of each keyway another keyway joint is coupled and a plurality of elongated keys are locked on to said keyway joints. This process is continued until said structure is completed. The structure as completed, relies on tensile and compression forces for self sustaining itself and without the need of any other connecting means. The keyway joint and key are of such simplistic construction that the structure to be fabricated may be done so by one having no skills and without the need for any tools whatsoever.

These and other features of the invention will be further emplified in the drawings and in the detailed description.

IN THE DRAWINGS

The drawings illustrate and detail the best mode contemplated by the applicant for carrying out the practice of the invention.

FIG. 11 is an elevation view of second type of structure.

FIG. 12 is a perspective view of a key used in this invention.

FIG. 13 is a perspective view of a keyway used in this invention.

FIG. 14 is a perspective view of another form of a key used in this invention.

FIG. 15 is a perspective view of yet another form of a key used in this invention.

FIG. 16 is a perspective view of another form of key used in this invention.

FIG. 17 is a top elevation view of a keyway joint used with this invention.

FIG. 18 is a top view of yet another form of keyway joint.

FIG. 19 is a top view of another form of keyway joint.

DESCRIPTION

Figure 1:
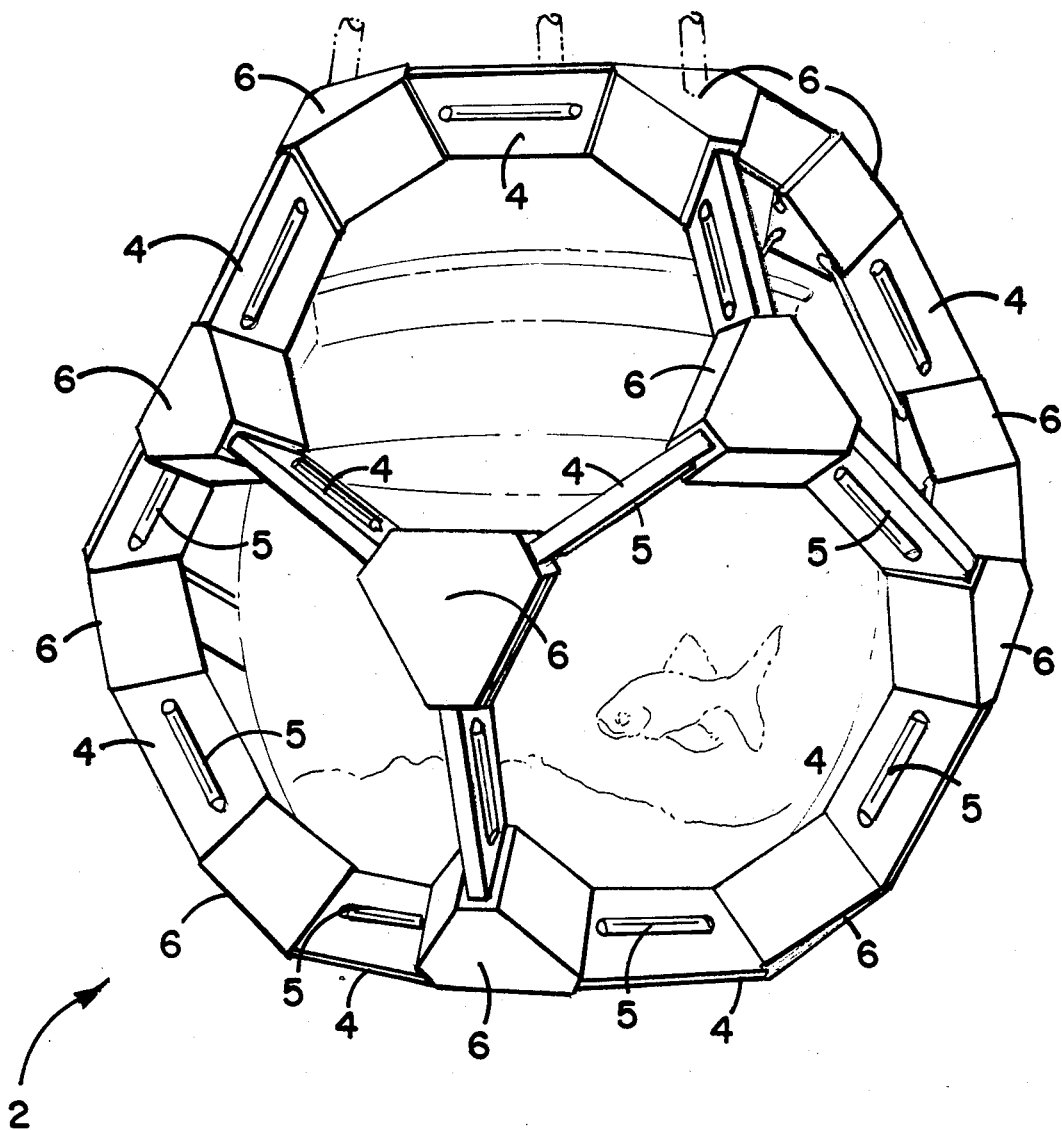
FIG. 1 is an elevation view of a completed geodesic structure.

In the drawings and referring particularly to FIG. 1, a geodesic structure assembly 2 is shown as one of the structures contemplated by the present invention. The structure 2 is constructed of elongated keys 4 and keyway joints 6. The keys and keyway joints may be made from materials such as plastics, wood or any other rigid type of material, e.g. aluminum.

The key 4 is generally of flat body construction and the ends 8 and 10 terminate at predetermined angles A and B. The angles A and B are determined by the type of structure contemplated. Further, the key ends 8 and 10 terminate in a hemispheric configuration for purposes which will later become evident. The elongated key 4 may be easily manufactured by injection mold processes if made out of plastic materials. The key 4 also includes a reinforcing rib 5 which is provided along the entire length of the elongated key 4.

Figure 3:
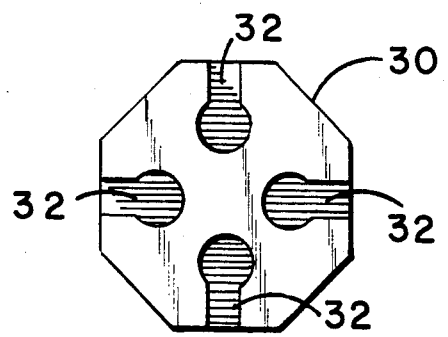
FIG. 3 is a top view of a modified keyway joint which can be used in geodesic construction.
Figure 2:
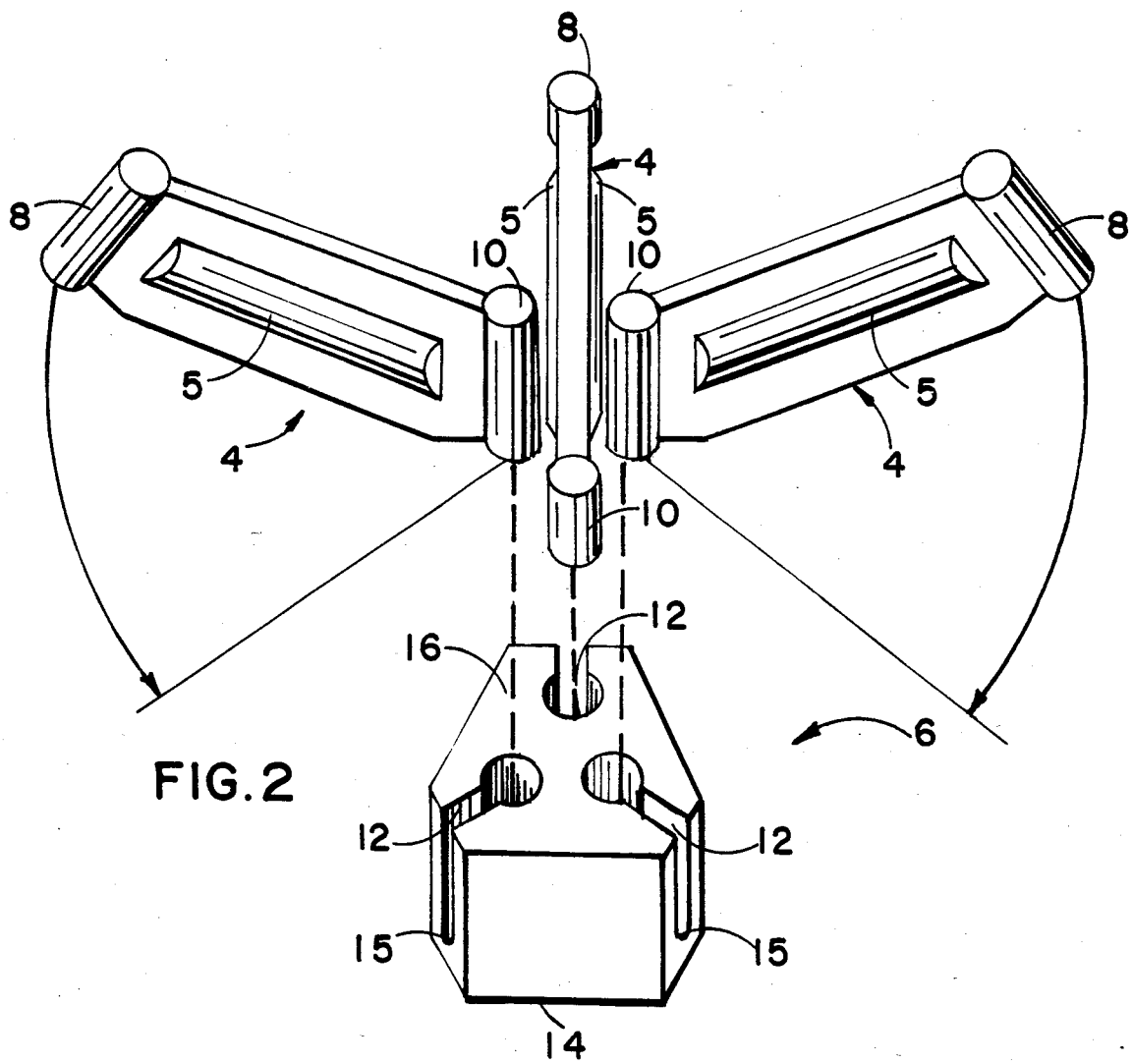
FIG. 2 is an exploded perspective view of one keyway joint and interlocking keys used in the construction of the geodesic structure.

The keyway joint 6 as shown in FIG. 2 is triangular in configuration although not necessarily restricted thereto as evidenced by a second embodiment of a keyway joint 30 shown in FIG. 3, which is octagonal in construction. Keyway joint 6 has a plurality of elongated keyway slots 12 which terminate in a hemispheric configuration of a size for receiving a key end 8 or 10. The keyway joint 6 has a first end 14, a shoulder member at 15 and a second end 16. The slot 12 begins at some distance from the key end 14 and continues on to the key end 16. The keyway slots 12 shown in FIG. 2 are equilaterally spaced from each other. Again, it is noted that this spacing between keyway slot 12 is determined by the type of structure contemplated.

Figure 4:
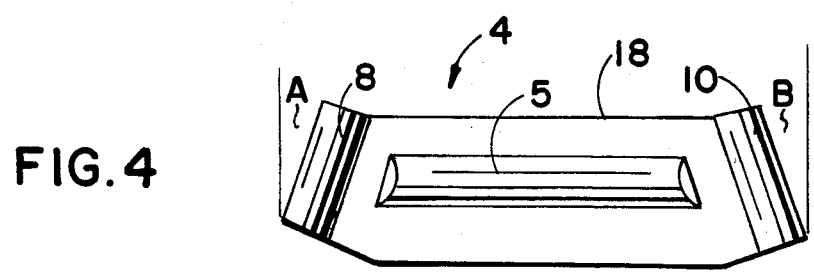
FIG. 4 is a side elevation view of one form of key used in the invention.

Referring to the key ends 8 and 10, see FIG. 4, it can be seen that they are angularly disposed from a line normal to the top edge 18 of the key 4. Again, it is noted that this angular disposition is dictated by the type of structure contemplated. Again, referring to FIG. 4, in particular, each key 4 is provided with a reinforcing rib 5 across a portion of thelength of the key 4. This rib 5 is found on both sides of the key 4 and provides for additional strength in coping with any tensile and or compression forces which may be imposed upon the structure 2.

In assembly, the key ends 8 or 10 are inserted into the keyway joint slots 12, and when fully inserted, the key ends 8 or 10 will be flush with the shoulder 15. Keyway joints 6 are next inserted onto the radiating key ends 8 or 10. Now, additional keys 4 are inserted into the keyway joint slots 12 of the newly added keyway joints 6. This process is continued until the structure is completed, in the embodiment just described, the structure is a geodesic structure, capable of being used as a planter or as some container. The more weight that is put in the structure or within the structure 2, tends to result in a stronger structure.

In actual practice, kits will be sold containing all the keys 4 and keyway joints 6 necessary to make a particular structure. No tools or fasteners are required and the structure assembly is fool proof in that it can only be assembled in one form. No skill whatsoever is required in the assembly of structures made with this invention.

Figure 6:
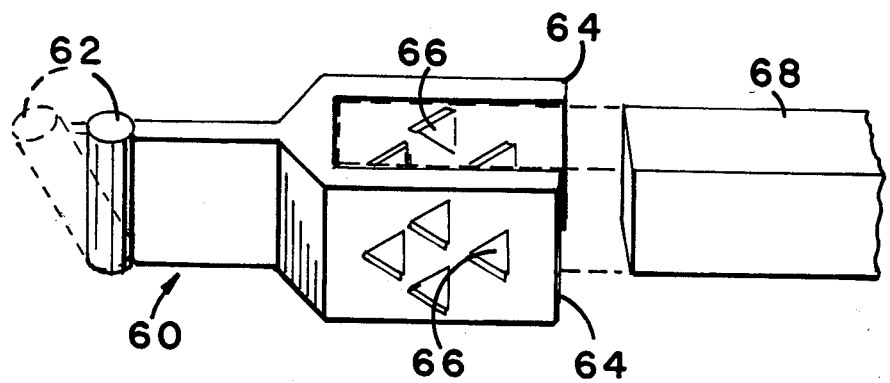
FIG. 6 is an elevation view of third embodiment of a key used in this invention.

Referring to FIG.6, there is disclosed a novel keyway 60 which terminates in a tenon like configuration 62 at one end and in a U-type configuration 64 at the other end. Located on the sides of the U walls, extending resilient triangular buttons 66. Girder 68 is used in conjunction with the keyway 60 such that the girder 68 is inserted into the U-shaped 64 and is held there by the resiliently biased buttons 66. The length of the girder 68 is not shown inasmuch as the length will be determined by the structural configuration desired. This type of keyway and girder lend themselves to the building of walls, greenhouses and the like.

Figure 7:
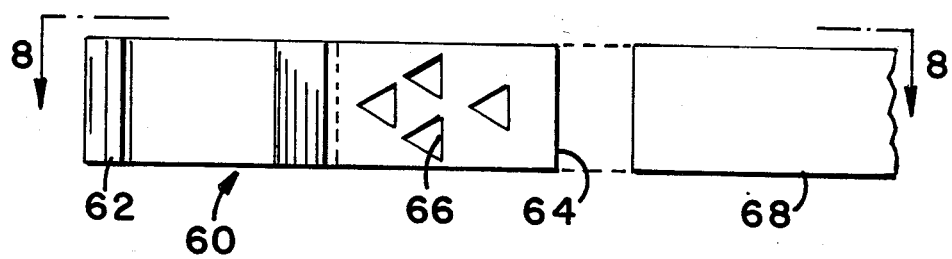
FIG. 7 is a side view of the embodiment shown in FIG. 6.
Figure 8:
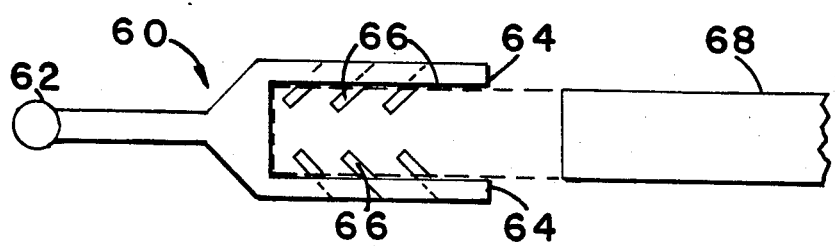
FIG. 8 is a top view of the embodiment shown in FIG. 6.

FIGS. 7 and 8 further illustrate in more detail the unique structure of the novel keyway 60. The buttons 66 are illustrated clearly such that it can be seen that this type of structure is readily made for receiving and retaining a girder 68.

Figure 9:
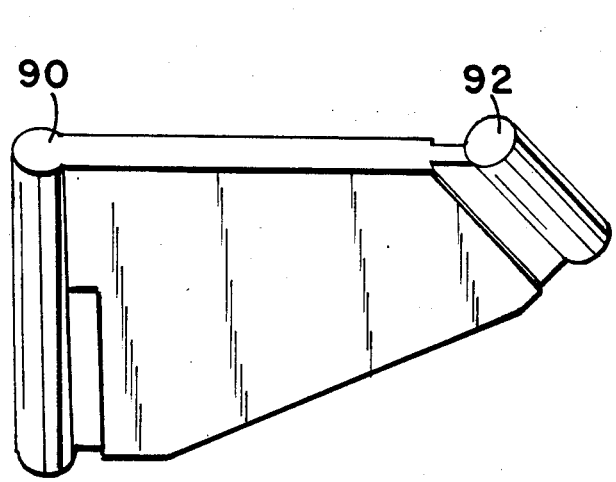
FIG. 9 is a side view of a fourth embodiment of a key used in this invention.

FIG. 9 discloses a keyway 60 again having tenon shaped ends 90 and 92. As can be seen, the structure is an irregular four sided flat object. This type of key can be used when one desires the interior of the structure to have a somewhat horizontal design. This could be used for example, in a geodesic structure being used to house a planter.

Figure 10:
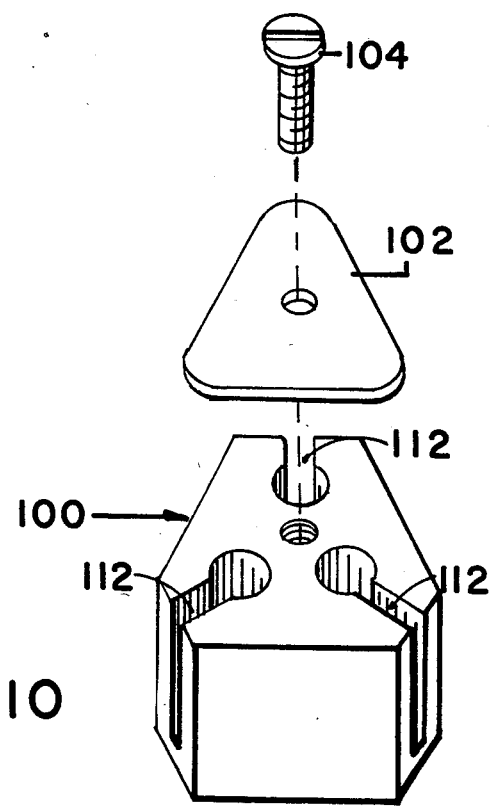
FIG. 10 is an exploded perspective view of a second embodiment of a keyway joint used in this invention.

FIG. 10 discloses a key joint 100 which is an embodiment of the keyway joint 6. This keyway joint 100 includes a retaining washer 102 and retaining screw 104. The retaining washer serves to retain the keyway ends 8 or 10 within the openings 112. This type of combined structure might be used in an environment in which there is some vibration. The vibration might cause the keyway end 8 or 10 to come loose out of the openings 112, with the retaining ring 102 in place, this is now highly improbable.

FIG. 3, disclosed another embodiment of a keyway joint 30. This keyway joint is used in the same manner as keyway joint 6 except that now there is shown an octagonal structure having four keyway slots 32.

Figure 5:
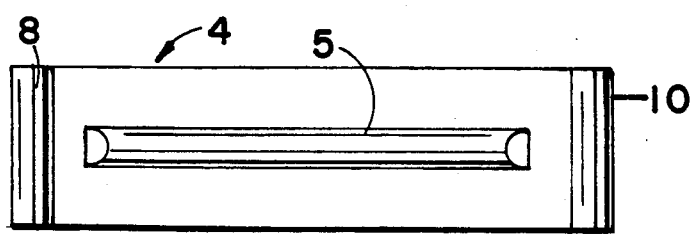
FIG. 5 is a side elevation view of a second embodiment of a key used in this invention.

FIG. 5 discloses an embodiment of the invention in which the keyway is not disposed to any type of angular termination. What is shown in FIG. 5 is a straightway keyway which is used in the event the builder wants to elongate the structure. Also, the keyway in FIG. 5 has the reinforcing rib throughout the majority part of the length thereof.

Again referring to FIG. 1, there is illustrated a geodesic structure made in conformance with this invention, and in which their is retained an aquarium. However, it can be easily seen that this type of structure can be used to hold and retain countless objects, e.g. planters and the like.

Referring to FIG. 11, attention is directed to yet another type of structure which can be built using the applicant's invention. There is illustrated a partial geodesic structure 111, which can be used for the construction of greenhouses. An anchor member 130 is shown pivotally connected at one end to a plurality of points along the perimeter of the structure. At the other end of the anchor member 130, is connected to a joint member such as member 170illustrated in FIG.17. Also connected to each joint member 170 is an elongated keyway member 132 which connects one joint member to another. The length of the keyway members 132 determines the size and configuration of the structure. The structure 111 shown in FIG. 11 is anchored to the ground surface inorder to prevent it from being moved about by outside forces. The structure 111, which may be used as a greenhouse skeleton, is assembled completely on the ground and raised to a standing position when assembly is complete.

FIG. 12, a form of a keyway member 120, which can be used in the construction of a structure contemplated by the invention.

FIG. 13, illustrates a view of the anchor member 130 shown in FIG. 11.

FIG. 14 illustrates yet another form of a keyway member 140.

FIG. 15 depicts yet another form of a keyway member 150.

FIG. 16 illustrates a keyway member 160 which terminates at one end 162 in a curvilinear configuration and which terminates at the other end in an elongated slot 164 and which also contains an opening 166 for receiving some bearing member.

FIG. 17 illustrates yet another joint member 170 having provisions for receiving four keyway member. A cover 172 is secured on said joint member 170 for retaining said keyway members in a fixed position by means of a retaining screw 174.

FIGS. 18 and 19 both illustrate yet other forms of joint members 180 and 190 which can be used for retaining keyway members.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

I claim:

1. A structure comprising:
   (a) a plurality of flat rigid triangularly sided joint members, having an elongated slot on each side of said joint member, said elongated slot extending from a shoulder member located at one end thereof and terminating at the other end thereof, said elongated slot forming a mortise type configuration, and said elongated slots being equidistantly spaced from each other.
   (b) a plurality of elongated flat rigid members, having a raised reinforcing rib, on each side thereof, throughout the length thereof, said member terminating a configuration generally resembling a tenon, said tenon being of a dimension for being engagingly received by the mortise shaped shaped elongated slots on said joint members, said terminating ends of said flat members, being angularly disposed when measured from a line normal to the top of said flat rigid members, and means for capping said slots on said triangularly sided joint members, and
   (c) said structure being assembled by connecting a predetermined number of said joint members to said flat rigid members, said flat rigid member ends being inserted into said elongated slots and retained therein until the formation of a completely closed structure.

2. A geodesic structure comprising:
   (a) a plurality of keyway joint members being generally flat rigid multisided bodies and having a top and bottom side, and having a plurality of elongated mortise shaped slots extending from a shoulder member located at the bottom of said keyway joint and extending on through the top of said keyway joint member, said elongated mortise shaped slots being spaced at equal distances from each other.
   (b) a plurality of elongated flat rigid key members, having top and bottom edges, a pair of opposing raised ribs positioned on the sides defining the flat portion of said key member, said key member terminating at each of two ends in a tenon shape and further, said terminating ends being angularly disposed from a line normal to said top edge, said elongated key members being irregular four sided structures, and
   (c) a plurality of said key members inserted into a like plurality of said keyway joint member elongated slots in a locking tenon mortise relationship, said geodesic structure assembled by connecting a predetermined number of keyway joint members and a predetermined number of key members until the formation of a completely closed structure.

* * * * *